(12) United States Patent
Reynolds et al.

(10) Patent No.: US 7,628,336 B2
(45) Date of Patent: *Dec. 8, 2009

(54) TRANSACTION CARD WITH THERMOCHROMIC FEATURE

(75) Inventors: Adam W. Reynolds, Minneapolis, MN (US); Ted C. Halbur, Lino Lakes, MN (US); Chad Albers, Minneapolis, MN (US); Stacy M. Jensen, Anoka, MN (US)

(73) Assignee: Target Brands, Inc., Minneapolis, MN (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/753,856

(22) Filed: May 25, 2007

(65) Prior Publication Data

US 2008/0290178 A1 Nov. 27, 2008

(51) Int. Cl.
- G06K 19/06 (2006.01)
- G06K 19/00 (2006.01)
- G06K 5/00 (2006.01)
- G06F 17/00 (2006.01)

(52) U.S. Cl. .................. 235/494; 235/375; 235/380; 235/383; 235/449; 235/451; 235/491; 235/492; 235/493; 235/487; 235/488

(58) Field of Classification Search ................. 235/375, 235/380, 383, 449, 451, 487, 488, 491–494
See application file for complete search history.

(56) References Cited

U.S. PATENT DOCUMENTS

| 4,505,498 A * | 3/1985 | Weinberger | 283/91 |
| 5,282,651 A * | 2/1994 | Alonso | 283/117 |
| 5,500,040 A | 3/1996 | Fujinami | |
| 6,572,021 B1 * | 6/2003 | Lippert | 235/481 |
| 6,676,021 B1 * | 1/2004 | Luski et al. | 235/491 |
| 7,335,624 B2 * | 2/2008 | Senga et al. | 503/201 |
| 7,360,692 B2 * | 4/2008 | Zellner et al. | 235/380 |

(Continued)

OTHER PUBLICATIONS

Gemplus Banking, "Card Designs—Plastic Fantastic," http://www.gemplus.com/pss/banking/offer/card_designs.html, available online at least as early as Feb. 12, 2006 based on the internet archive available at www.archive.org, 4 pgs.

(Continued)

Primary Examiner—Thein M. Le
Assistant Examiner—Tuyen K Vo
(74) Attorney, Agent, or Firm—Griffiths & Seaton PLLC (57) ABSTRACT

A transaction card includes a substrate and a thermochromic feature. The substrate defines a first surface and includes an account identifier linking the transaction card to at least one of an account and a record. The account identifier is machine readable by a point-of-sale terminal. The thermochromic feature portrays a character on a portion of the first surface. The thermochromic feature is configured to change between a first state and a second state when an actual temperature of the thermochromic feature reaches an activation temperature of the thermochromic feature. In the first state, the thermochromic feature appears as a first color. In the second state, the thermochromic feature presents at least one of a second color and a graphic not otherwise visible when the thermochromic feature is in the first state. Stored-value cards, combinations, methods of providing a transaction card, and other embodiments are also disclosed.

27 Claims, 9 Drawing Sheets

U.S. PATENT DOCUMENTS

| | | | |
|---|---|---|---|
| 2002/0143697 | A1 | 10/2002 | Gotfried |
| 2002/0170461 | A1 | 11/2002 | Mehta et al. |
| 2003/0122113 | A1* | 7/2003 | Senga et al. ............... 252/586 |
| 2007/0017973 | A1* | 1/2007 | Blank et al. ............... 235/380 |
| 2008/0000965 | A1* | 1/2008 | Zellner et al. ............... 235/380 |
| 2008/0054077 | A1* | 3/2008 | Zellner et al. ............... 235/492 |

OTHER PUBLICATIONS

Converting Magazine, "TLMI winners display 'air of uniqueness'," http://www.convertingmagazine.com/cgi-bin/news.cgi?arta=10_20_03.html, printed on May 15, 2007, 4 pgs.

Chromatic Technologies, "Thermochromic Inks," http://www.ctiinks.com/page.asp?pageid=0|4|23|120&amp;amp;amp;amp;id=0|thermochromic_color_chart, printed on May 17, 2007, 1 pg.

Thermographic Measurements Co. Ltd., "ChromaZone® Slurry Technical Data," www.chromazone.co.uk/tds-files/CZ%20Slurry%20TDS.pdf, printed on May 17, 2007, 2 pgs.

Target GiftCard, available for retail sale in Target stores at least as early as Mar. 2003, 1 pg.

Home Depot Naughty/Nice Gift Card, available for retail sale in Home Depot stores at least as early as Dec. 2006, 2 pgs.

* cited by examiner

TRANSACTION CARD WITH THERMOCHROMIC FEATURE

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a transaction card including a substrate and a thermochromic feature. The substrate defines a first surface and includes an account identifier linking the transaction card to at least one of an account and a record. The thermochromic feature portrays a character on a portion of the first surface. The character is a being, and an outer perimeter of the character defines an outer perimeter of the thermochromic feature. The thermochromic feature is configured to change between a first state and a second state when an actual temperature of the thermochromic feature reaches an activation temperature of the thermochromic feature. In the first state, the thermochromic feature appears as a first color. In the second state, the thermochromic feature presents at least one of a second color and a graphic not otherwise visible when the thermochromic feature is in the first state. Stored-value cards, methods of providing a stored-value card, and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or transaction product, such as a gift card, is adapted for making purchases of goods and/or services at, for example, a retail store or web site. According to one embodiment, an original consumer buys a stored-value card to give a recipient who in turn is able to use it to pay for goods and/or services. A stored-value card, according to embodiments of the present invention, provides the consumer and/or recipient with one or more thermochromic features configured to each change in visual appearance when subjected to temperature variations.

According to embodiments of the present invention, a thermochromic feature is provided with thermochromic ink configured to change colors or degree of transparency when heated beyond a transition or activation temperature. More specifically, in one example, when a bearer of the stored-value card presses a finger against the thermochromic feature, human body heat from the card bearer's fingers causes the thermochromic ink to warm. In one embodiment, human body heat is sufficient to warm an actual temperature of the thermochromic ink to the activation temperature, which in turn, causes the thermochromic ink to change color or transparency. In one embodiment, the thermochromic ink is selectively applied to the stored-value card in a manner confining the thermochromic ink to one or more subjects or areas graphically depicted on the stored-value card. In some instances, a raised ink is printed to define accent indicia around the thermochromic ink (e.g., around the outer borders of the subject) providing relief or texture and further contributing to the aesthetically pleasing nature of the stored-value card.

Turning to the figures, FIGS. 1-7 illustrate various views of one embodiment of a financial or stored-value product or card 10 including a substrate 12 and defining a heat-sensitive or thermochromic feature 14. Substrate 12 is any suitable material such as a somewhat rigid yet flexible material similar to that commonly used for identification cards, credit cards, etc.

More specifically, in one embodiment, substrate 12 is a substantially planar member formed of paper, cardstock, plastic (e.g. polycarbonate, polystyrene, polyvinyl chloride (PVC), acrylonitrile butadiene styrene (ABS), polyethylene terephthalate (PET), teslin, polyactide (PLA), and acrylic), or other suitable material. In one embodiment, substrate 12 is formed of injection molded plastic or cut from sheet-stock plastic material. Substrate 12 can be formed in any other suitable planar or non-planar configuration as will be apparent to those of skill in the art upon reading this application.

In one embodiment, substrate 12 defines a first surface 20 (i.e., a first major surface) and a second surface 22 (i.e., a second major surface) opposite first surface 20 separated by a thickness of stored-value card 10. In one embodiment, at least one of first and second surfaces 20 and 22 is substantially planar. In one embodiment, substrate 12 is, substantially rectangular in shape, and, in one example, is similarly sized to an identification card, a credit card, or other card sized to fit in a wallet of a card bearer (i.e. is wallet sized). Accordingly, in one example each of first and second surfaces 20 and 22 are substantially rectangular and/or otherwise wallet sized. In particular, in one embodiment, the overall dimensions of substrate 12 are about 8.5 cm by about 5.5 cm wide with a thickness of less than about 1 mm. In other embodiments, substrate 12 is otherwise shaped as a square, circle, oval, star, or any other suitable shape.

Figure 3:
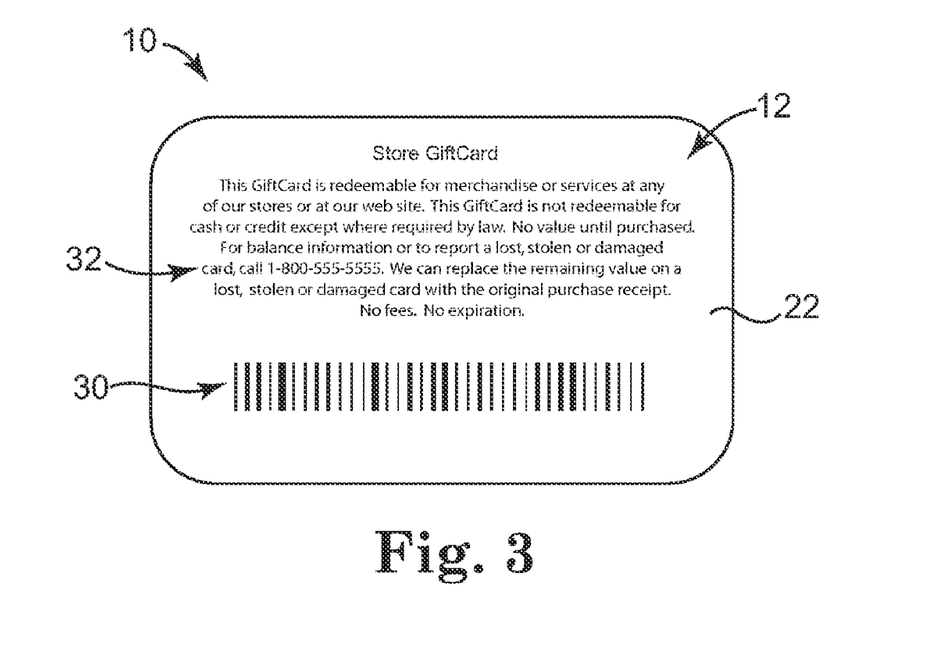
FIG. 3 is a rear view illustration of the stored-value card of FIG. 1.
Figure 4:
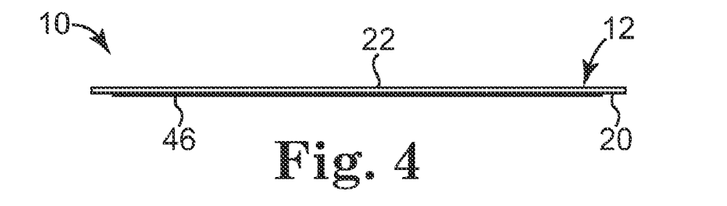
FIG. 4 is a top view illustration of the stored-value card of FIG. 1.
Figure 5:
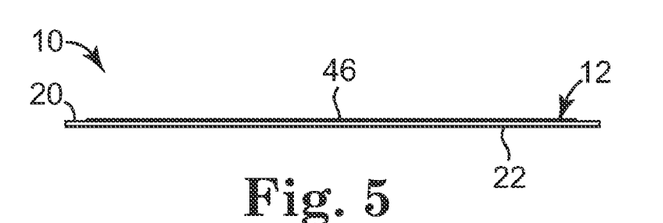
FIG. 5 is a bottom view illustration of the stored-value card of FIG. 1.
Figure 6:
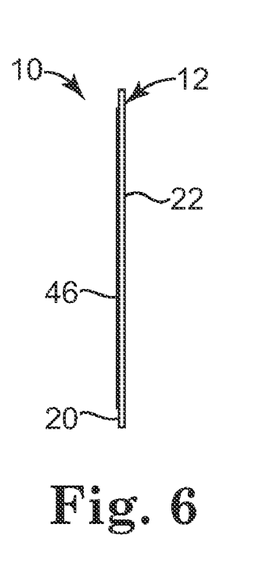
FIG. 6 is a right side view illustration of the stored-value card of FIG. 1.
Figure 7:
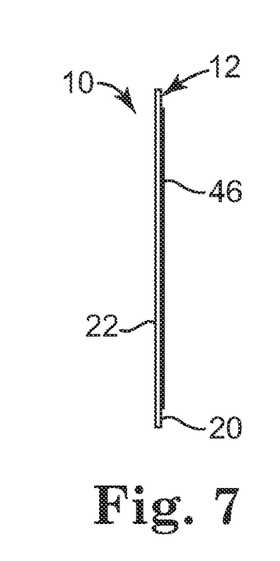
FIG. 7 is a left side view illustration of the stored-value card of FIG. 1.

Referring to the rear view illustration of FIG. 3, stored-value card 10, for example, second surface 22 of substrate 12, includes at least one account activation area or account identifier 30, such as a bar code, a magnetic strip, a smart chip or other electronic device, a radio frequency identification (RFID) device, or other suitable identifier readily machine readable by a point-of-sale terminal, account access station, kiosk, or other suitable device. In one embodiment where account identifier 30 is machine readable, account identifier 30 is also readable by a bearer of stored-value card 10 such that stored-value card 10 can be used when a machine configured to read stored-value card 10 is not present (e.g., when using stored-value card 10 to make a purchase on a web site). For example, account identifier 30 may include a number or letter string identifying the associated account or record and/or a password (not illustrated) associated therewith. In one embodiment, account identifier 30 is printed on or otherwise applied to second surface 22 of substrate 12; however, the account identifier 30 could additionally or alternatively be printed to the first surface 20 of substrate 12.

Account identifier 30 indicates and, therefore, links stored-value card 10 to, a financial or other stored-value account or record. The account or record indicates a value or balance (e.g., monetary value, points, minutes, or other balance) associated with stored-value card 10 and optionally is maintained on a database, other electronic or manual record-keeping system, or, in the case of "smart" cards for example, on a chip or other electronic device on/in stored-value card 10 itself. Accordingly, by scanning account identifier 30, the account or record linked to stored-value card 10 is identified and can subsequently be activated, have amounts debited therefrom, and/or have amounts credited thereto. Account identifier 30 is one example of means for linking stored-value card 10 with an account or record.

In one embodiment, redemption indicia 32 are included on stored-value card 10 such as on second surface 22 of substrate 12. Redemption indicia 32 indicate that stored-value card 10 is redeemable for the purchase of goods and/or services and that, upon use, a value of the purchased goods and/or services will be deducted from the account or record linked to stored-value card 10. In one embodiment, redemption indicia 32 include phrases such as "<NAME OF STORE> GiftCard" and "This GiftCard is redeemable for merchandise or services at any of our stores or at our web site," and/or provides help or phone line information in the case of a lost, stolen, or damaged stored-value card, etc.

In one embodiment, stored-value card 10 includes background indicia 40. Background indicia 40 include any suitable graphics, text, or combinations thereof. In one example, background indicia 40 include one or more brand identifiers 34 and/or decorative items 36. Brand identifiers 34 include one or more of a logo, text, trademark, etc. that associate stored-value card 10 with at least one of a product, a brand, a store, etc. In one embodiment, decorative items 36 define a target or subject 42 for subsequently receiving thermochromic ink 44 as will be further described below. Other indicia or additional features may also be included on stored-value card 10 as will be apparent to those of skill in the art upon reading this application. In one example, any one or more of indicia 32, brand identifier 34, and background indicia 40 may not be included on stored-value card 10.

Figure 1:
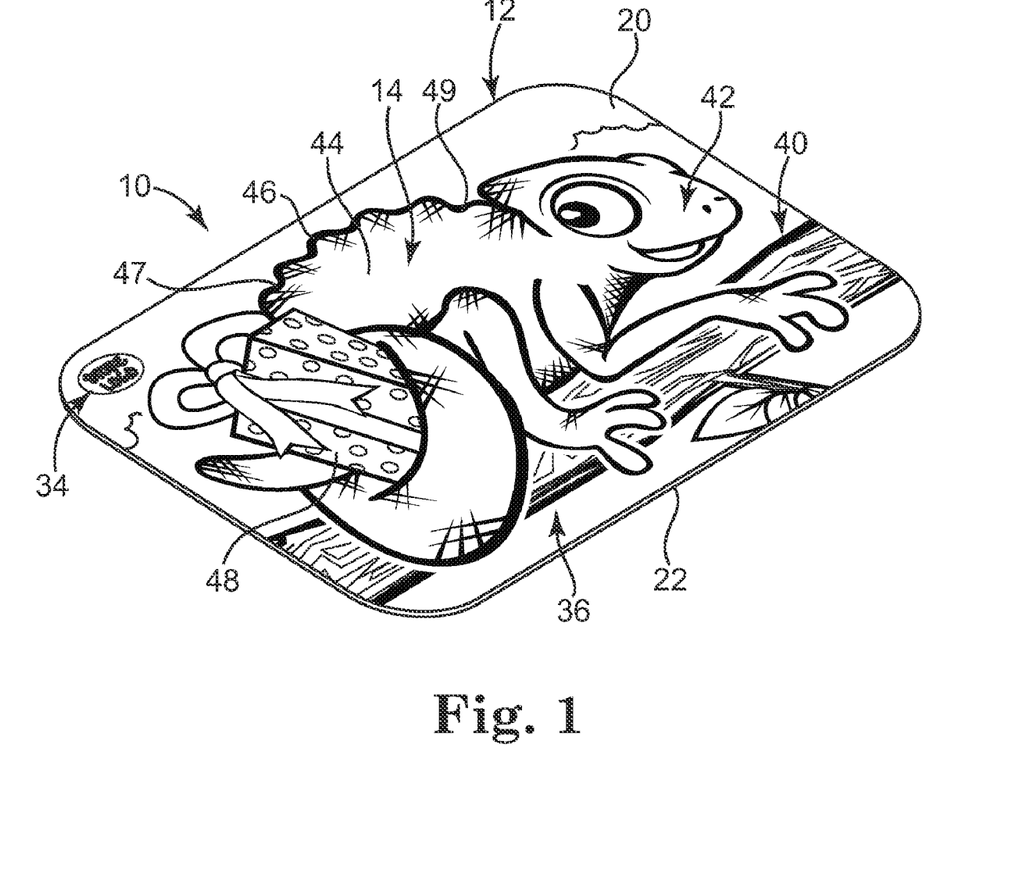
FIG. 1 is a perspective view illustration of a stored-value card with a thermochromic feature, according to one embodiment of the present invention.
Figure 2:
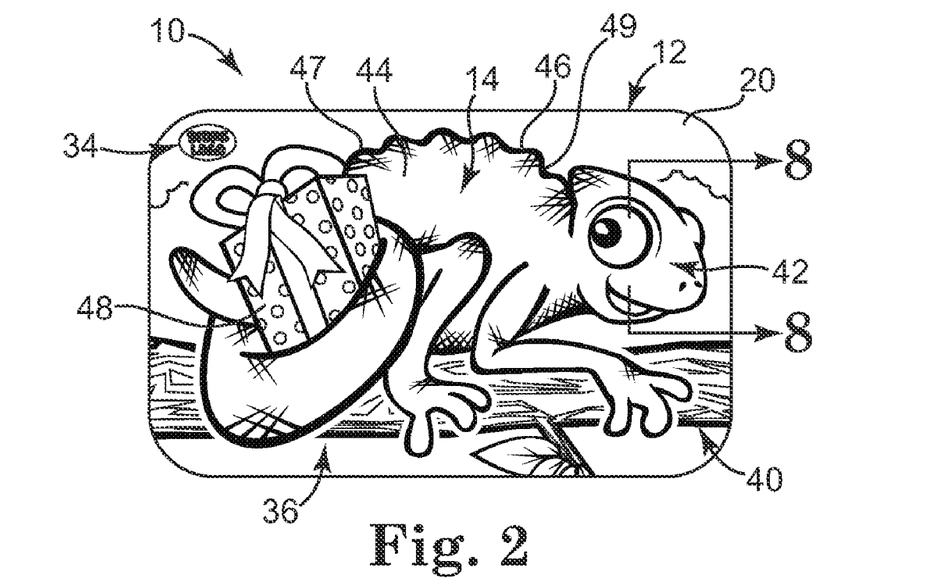
FIG. 2 is a front view illustration of the stored-value card of FIG. 1.
Figure 10:
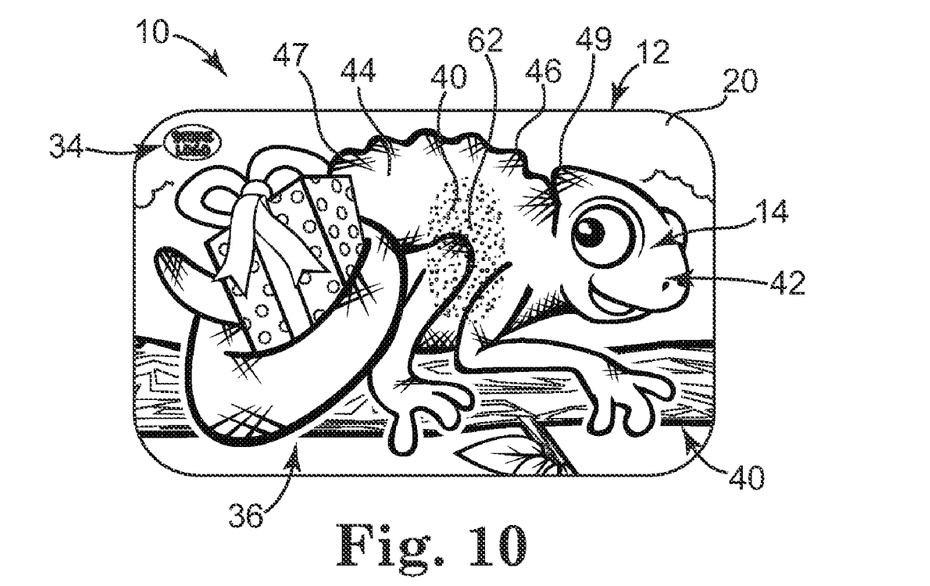
FIG. 10 is a front view illustration of the stored-value card of FIG. 1 when heat has been applied to the thermochromic feature thereof, according to one embodiment of the invention.

In one embodiment, thermochromic feature 14 is defined on first surface 20 of substrate 12. In one example, thermochromic feature 14 is defined by printing heat-sensitive or thermochromic ink 44 over at least a portion of first surface 20, which, in some instances, includes applying thermochromic ink 44 over background indicia 40. In one embodiment, where background indicia 40 define subject 42, thermochromic ink 44 is applied directly over subject 42. More specifically, referring to FIG. 2, in one embodiment, subject 42 is in the general shape of a character printed in a first color or in a pattern on first surface 20. In one embodiment, the character is any fictional or non-fictional being such as one of a person, an animal (e.g., a mammal, reptile, etc.), an insect, and a fictional creature. In one example, the character is subject of a book, subject of a television show, subject of a movie, or subject of another media format. For example, subject 42 illustrated in FIGS. 1, 2, and 10 is a lizard the coloring of which may illustrate subject 42 as one of a fictional lizard and a non-fictional lizard.

In view of the above, in one example, an outer perimeter 47 of subject 42 (e.g. where subject 42 portrays a character) defines an outer perimeter 49 of thermochromic feature 14. As such, in one example, subject 42 and thermochromic feature 14 share an outer perimeter 47/49. Thermochromic ink 44 is applied over subject 42, fore example, within the confines of outer perimeter 49 to appear as the character. In one embodiment, thermochromic ink 44 is printed in a second color that differs from the first color of subject 42. Notably, second color is considered different from first color when the shades of the two colors are different. For example, first color may be a dark hunter green while the second color is a lighter moss green.

Thermochromic ink 44 is any suitable heat-sensitive ink. In one example, thermochromic ink 44 includes thermochromic capsules in an aqueous based dispersion to form a slurry. The capsules each have a substantially impervious polymeric wall and, in one embodiment, a length less than about 6 microns. In one embodiment, each capsule includes an organic acid, a thermochromic colorant, and a solvent, wherein the organic acid and the colorant are configured to selectively interact with one another to transition thermochromic ink 44 and, therefore, thermochromic feature 14, between a first or visible state and a second or translucent state. In one embodiment, when in a colored state, the temperature of thermochromic ink 44 is below a melting point of the solvent such that the solvent is in a solid state. When in a solid state, the solvent generally pushes the organic acid and the colorant closer together and into electron interaction with one another, which, in turn, produces a visible color.

When the capsules are warmed above the melting point of the solvent (i.e. above an activation temperature of thermochromic ink 44), the solvent at least partially liquefies and distances the organic acid from the colorant and limits or prevents any electron interaction between the two. When the organic acid and colorant are separated, substantially no visible color is visible when viewing thermochromic ink 44 (i.e., thermochromic ink 44 is substantially transparent). Suitable organic acids includes weak acids such as bipenel A, parabens, 1,2,3-triazole derivates, and 4-hydrixycoumarin for forming thermochromic ink 44 with a reversible state change and stronger acids for thermochromic ink 44 with irreversible state changes. Suitable slurry examples configured to be colored below the activation temperature and to be substantially transparent above the activation temperature are available as Chromzone® Slurries from Thermographic Measurements, Ltd. of Devon, England. Other suitable slurries will by apparent to those of skill in the art upon reading this application.

Although primarily described as transitioning from a first, colored state to a second substantially transparent state when the activation temperature is reached, in one embodiment, thermochromic ink 44 is configured to transition from a from a first, colored state to a second colored state. In one embodiment, an additional non-thermochromic colorant is included in the capsules to create thermochromic ink 44 configured to change from a first color to a second color. For example, where the non-thermochromic colorant is yellow and the thermochromic colorant is red in the first state and substantially transparent in the second state, the thermochromic feature 14 is configured to change from a first orange color to a second yellow color.

Based on this general functionality, thermochromic inks 44 are available with a variety of activation temperatures in a range from about −10° C. to about 69° C., for example, about −10° C., about 15° C., about 25° C., about 31° C., about 47° C., or about 69° C. Activation temperatures ranging from about 20° C. to about 30° C., for example, about 25.5° C., are particularly well suited for applications where body heat will be used to reach the activation temperature of thermochromic ink 44.

In one embodiment, the capsules are mixed into an ink base for application to stored-value card 10. In one example, the capsules are mixed into a UV-curable screen ink base. As such, thermochromic ink 44 is UV-curable and configured to be applied to substrate 12 in a screen printing method. Use of screen ink and the screen printing method allows thermochromic ink 44 to be applied in a relatively thick manner as compared to background indicia 40. In general, the thicker thermochromic ink 44 is applied to substrate 12, the more opaque it will appear and the more completely any background indicia 40 therebelow will be masked or hidden from view when thermochromic ink 44 is in a colored state. In one embodiment, thermochromic ink 44 is applied to substrate 12 with a thickness greater than about 25 microns and less than about 50 microns, for example, about 38 microns.

Creating thermochromic feature 14 using thermochromic ink 44 as described herein rather than using the conventional sheet application of thermochromic liquid crystals (i.e., chemical compound and mixtures that exhibit the mechanical properties of liquids and the optical characteristics of solids) to a substrate provides a number of advantages. For example, use of thermochromic ink 44 allows for additional freedom in applying thermochromic feature 14 to substrate 12. In particular, the design of thermochromic feature 14 is not limited to features that need be cut or formed from the sheet material prior to application to a substrate. As such, more curves and intricate features may be used in forming thermochromic feature 14. In addition, the manufacturing process is simplified. More specifically, the printing process for applying conventional inks requires little or no modification to print thermochromic ink 44 as opposed to the systems used to cut or size the liquid crystal sheets, to position the liquid crystal sheets relative to a target substrate, and/or to adhere or otherwise couple the liquid crystal sheets to the target substrate.

In one embodiment, following application of thermochromic ink 44 to substrate 12, additional accent indicia 46 are added. Since accent indicia 46 are applied after thermochromic ink 44, changes to thermochromic ink 44 caused by exposure to heat do not generally alter the appearance of accent indicia 46. In one embodiment, accent indicia 46 are applied to extend over or otherwise extend around outer perimeter 47 of subject 42, which, in one embodiment, is outer perimeter 49 of thermochromic feature 14, to effectively outline and further differentiate thermochromic feature 14 from background indicia 40 and first surface 20. Accent indicia 46 may be used to further define the character formed by thermochromic feature 14 and/or to outline other non-thermochromic features on substrate 12 such as other items depicted by background indicia 40, for example, a package 48 as depicted in FIGS. 1 and 2.

Accent indicia 46 may be printed or otherwise applied to stored-value card 10 in any suitable manner. In one embodiment, accent indicia 46 are screen printed to first surface 20 in a relatively thick manner to provide stored-value card 10, in particular, first surface 20, with relief (see e.g., FIG. 8) that is readily discernable by the bearer of the stored-value card 10 touching first surface 20. For example, accent indicia are provided with a thickness of greater than about 25 microns and less than about 50 microns, for instance, about 38 microns. In this manner, accent indicia 46 is one example, means for providing readily discernable texture to first surface 20 of substrate 12. In one embodiment, the relatively thick application of accent indicia 46 covers the thickness transition between first surface 20 with or without background indicia 40 and the boundary of thermochromic ink 44 to provide for a neat and aesthetically pleasing appearance.

Figure 8:
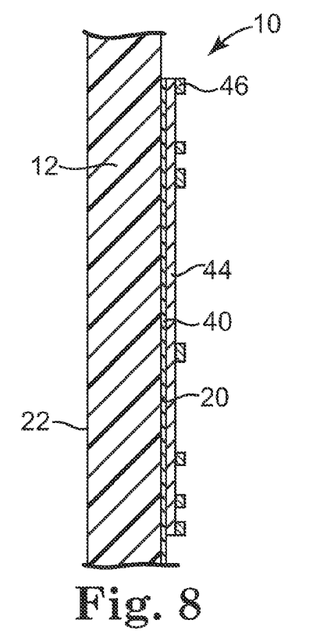
FIG. 8 is a cross-sectional view illustration taken along the line 8-8 in FIG. 2, according to one embodiment of the invention.
Figure 9:
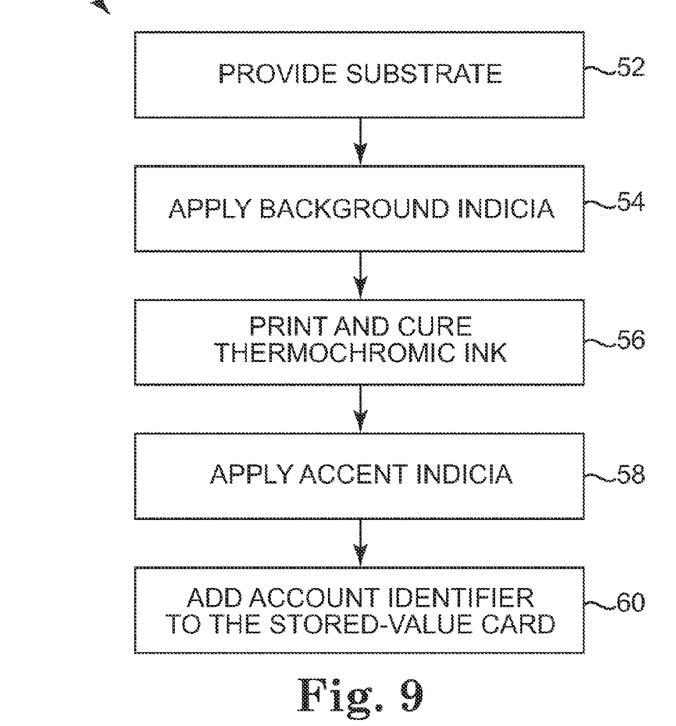
FIG. 9 is a flow chart illustrating a method of forming the stored-value card of FIG. 1, according to one embodiment of the invention.

One embodiment of a method of forming stored-value card 10 is generally indicated at 50 in FIG. 9 and is described with additional reference to FIGS. 1 and 8. More specifically, at 52, substrate 12 is provided. In one embodiment, substrate 12 is formed of PVC or ABS material and is characterized by an absence of varnish, polish, and/or film lamination to encourage adherence of printed background indicia 40, thermochromic ink 44, and/or accent indicia 46 thereto. Substrate 12 may be initially provided with account identifier 30 or account identifier 30 can be added before or after printing as will be further described below.

At 54, background indicia 40, if any, are printed or otherwise applied to substrate 12, more particularly, first surface 20 of substrate 12. In one embodiment, printing background indicia 40 includes defining subject 42. For instance, subject 42 may be defined with at least a first color and/or with a pattern, etc. In one example, background indicia 40 are printed to substrate 12 using an ultra-violet (UV)-curable ink. In such an example, once the ink is applied to substrate 12, the ink is cured by exposing substrate 12 with background indicia 40 to UV light.

At 56, thermochromic ink 44 is applied to substrate 12 to at least partially create thermochromic feature 14. Applying thermochromic ink 44 includes selecting a specific thermochromic ink 44 with a suitable activation temperature for a particular application, for example, selecting thermochromic ink 44 to have an activation temperature that can be reach by applying human body heat. In one embodiment, thermochromic ink 44 is selectively applied to first surface 20, for example, over subject 42 as opposed to being flood printed over an entirety of first surface 20. In other embodiments, thermochromic ink 44 is applied to cover the entirety of first surface 20. In one example, thermochromic ink 44 is applied to substrate 12 in a solid color printing method such as screen printing to fully cover a desired portion of first surface 20. For instance, in one embodiment, thermochromic ink 44 is applied with a flat bed screen printing process or a rotary screen unit using a screen having a mesh size between about 120 T and about 150 T (i.e., between about 1200 holes and about 1500 holes per square inch).

As suggested above, in one embodiment, thermochromic ink 44 is applied in a sufficiently thick layer to fully cover subject 42, such that when in the first, opaque state, thermochromic ink 44 masks subject 42 from view. In one example, thermochromic ink 44 is applied to substrate 12 with a thickness greater than about 25 microns and less than about 50 microns, for instance, about 38 microns. Following application of thermochromic ink 44 to substrate 12, in one embodiment, thermochromic ink 44 is cured under UV light as will be apparent to those of skill in the art upon reading the present application.

At 58, accent indicia 46, if any, are applied to substrate 12. Accent indicia 46 may be applied over or adjacent to one or more of background indicia 40 and thermochromic ink 44. In one embodiment, accent indicia 46 are applied to selectively cover portions of thermochromic ink 44 as desired to achieve a particular effect, such as around a perimeter of thermochromic ink 44 and/or over interior portions of thermochromic ink 44 to further define thermochromic feature 14. In one example, accent indicia 46 are applied with a relatively large thickness as compared to background indicia 40 and thermochromic ink 44 to create relief on first surface 20 of substrate 12 as indicated in FIG. 8. In one embodiment, accent indicia 46 are formed by a UV-curable ink printed over first surface 20 such as by a screen printing process and are subsequently cured under UV light.

At 58, account identifier 30 is added to stored-value card 10 if account identifier 30 has not otherwise already been added (e.g., printed to, embossed in, adhered to, etc.) or inherently formed as a part thereof prior to or during operations 52, 54, and 56.

Once thermochromic feature 14 is defined on stored-value card 10, a bearer of stored-value card 10 is able to interact with stored-value card 10 to witness the changing visual effect of thermochromic feature 14. For example, the bearer may place her thumb over the thermochromic feature 14, more specifically, thermochromic ink 44 to warm a portion, which, for illustrative purposes, is generally indicated with stippling at 62 in FIG. 10, of thermochromic feature 14. Placement of the card bearer's thumb on portion 62 warms thermochromic ink 44 and causes thermochromic ink 44 to transition from a first, opaque state to a second, substantially transparent state. In one embodiment, in which thermochromic feature 14 defines a character, such interaction with thermochromic feature 14 changes the appearance of the character to amuse the bearer of stored-value card 10.

When thermochromic ink 44 is transparent, background indicia 40 therebelow (i.e., between thermochromic ink 44 and substrate 12) are viewable to the card bearer. As such, in one embodiment where background indicia 40 printed below thermochromic ink 44 are a first color and thermochromic ink 44 is a second color when in the first, opaque state, heating portion 62 of thermochromic ink 44 appears to change portion 62 of thermochromic feature 14 from the second color to the first color. In this manner, thermochromic feature 14 is configured to present a first visual impression or appearance prior to heating and to transition to a second visual impression, which differs from the first visual impression or appearance, after heating. Thermochromic ink 44 can also be heated in any suitable manner other than by pressing a finger or thumb to thermochromic ink, such as by blowing hot air onto thermochromic ink 44 (e.g., by breathing onto thermochromic ink 44), etc. In one embodiment, thermochromic ink 44 may be reversible such that as the actual temperature of portion 62 is cooled, thermochromic ink 44 returns to the first, opaque state or irreversible such that thermochromic ink 44 remains in the second, substantially translucent state even after cooling.

Figure 11:
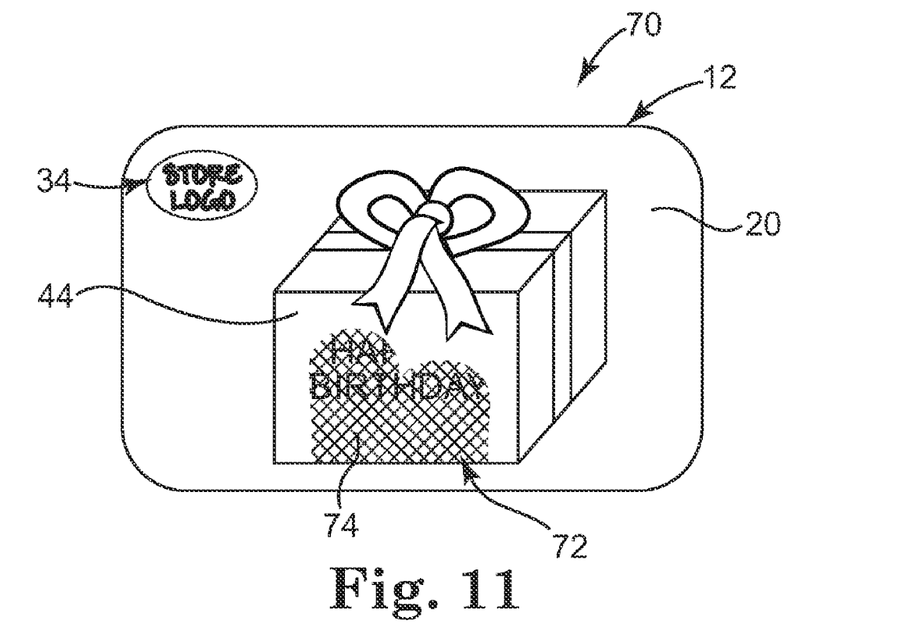
FIG. 11 is a front view illustration of a stored-value card when heat has been applied to a thermochromic feature thereof, according to one embodiment of the invention.

Although primarily described as placing thermochromic ink 44 over a solid color portion of background indicia 40, in one embodiment, background indicia 40 include text, graphics, and/or other patterns below thermochromic ink 44. For example, illustrates a stored-value card 70 similar to stored-value card 10 except where otherwise described herein. Stored-value card 70 includes substrate 12 with a thermochromic feature 72 formed thereon. More specifically, background indicia 74 are printed to substrate 12 and include one or more graphics, such as a pattern, object, text message, etc. that are covered with thermochromic ink 44. When the card bearer applies her fingers to or otherwise heats thermochromic ink 44 of stored-value card 10, the graphic(s) of background indicia 74 are revealed to the card bearer in addition to or as an alternative to the color change of thermochromic feature 72. Other variations and effects using background indicia 40 and thermochromic ink 44 will be apparent to those of skill in the art upon reading the present application. For example, a plurality of thermochromic features 14 and/or 72 may be formed on a single stored-value card 10 or 70.

Figure 12:
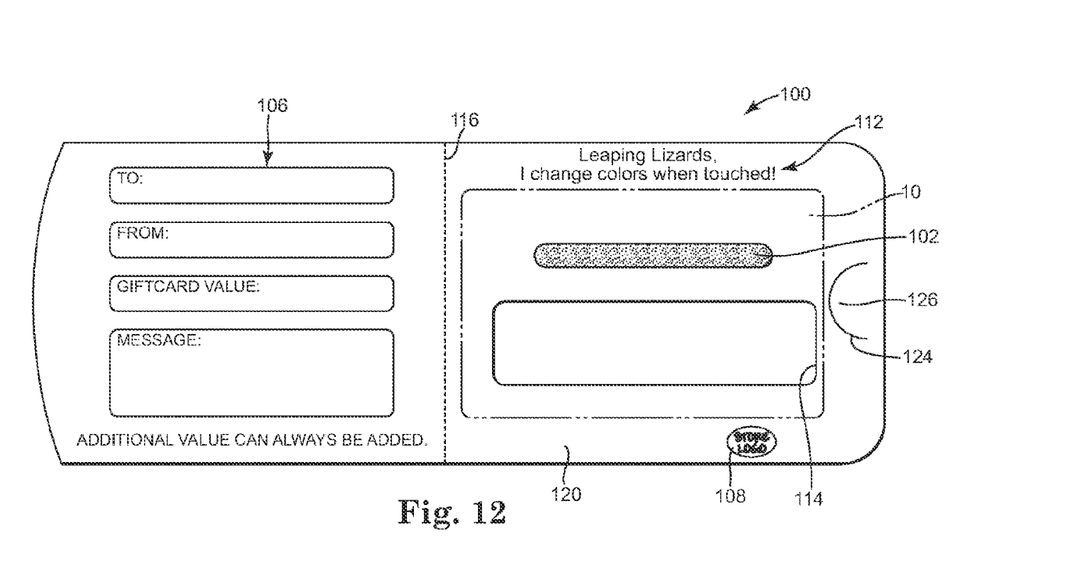
FIG. 12 is a front view illustration of a backer, according to one embodiment of the present invention.
Figure 13:
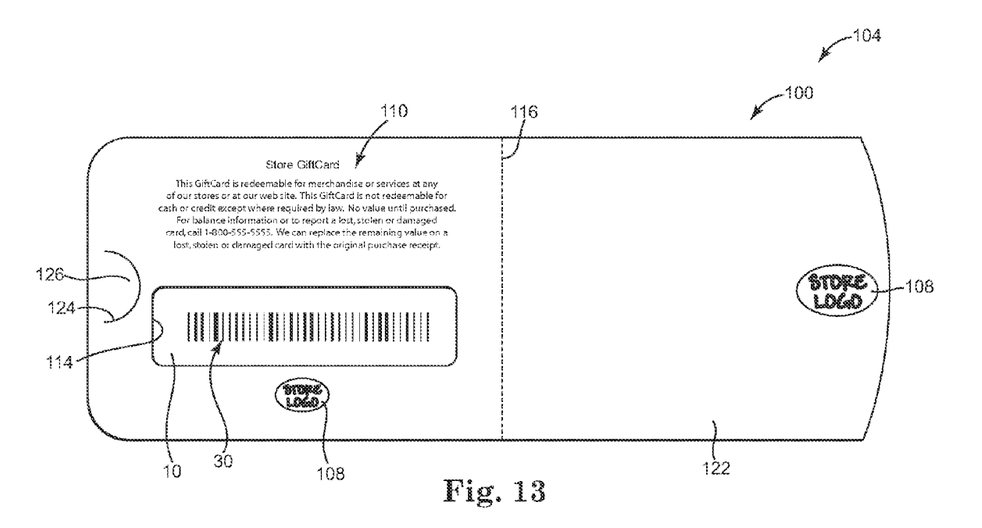
FIG. 13 is a rear view illustration of a stored-value card assembly including the backer of FIG. 12 and the stored-value card of FIG. 1, according to one embodiment of the present invention.

FIGS. 12 and 13 illustrate a carrier or backer 100 configured to be selectively coupled with and to support stored-value card 10. Stored-value card 10, which is represented in phantom lines in FIG. 12 for illustrative purposes so as to not obstruct backer 100, is readily releasably attached to backer 100, for example by a removable adhesive 102, an overlying skinning material, or the like. Backer 100 and stored-value card 10 collectively define a stored-value card assembly 104 (FIG. 13). Backer 100 comprises a single layer or multiple layers of paper or plastic material, for example, generally in the form of a relatively stiff but bendable/flexible card. Use of other materials is also contemplated. Backer 100 displays indicia, graphics or text information including store logo(s), store name(s), slogans, advertising, instructions, directions, brand indicia, promotional information, holiday indicia, seasonal indicia, media format identifiers, characters, and/or other information.

For example, indicia 106 include to, from, amount, and message fields. The fields of indicia 106 provide areas of backer 100 configured to be written upon by a consumer to personalize backer 100 for presentation as a gift to a particular recipient, for a particular purpose, and/or to indicate a value of stored-value card 10. In one embodiment, stored-value card 10 includes brand indicia 108, which identifies a store, brand, department, etc. and/or services associated with stored-value card 10.

Referring to FIG. 13, in one embodiment, backer 100 includes indicia 110 indicating that stored-value card 10 is redeemable for the purchase of goods and/or services and that upon use, a value of the purchased goods and/or services will be deducted from the financial account or record linked to stored-value card 10. In one embodiment, indicia 110 include phrases such as "<NAME OF STORE> GiftCard" and "This GiftCard is redeemable for merchandise or services at any of our stores or at our web site," and/or provides help or phone line information in case of a lost, stolen, or damaged stored-value card 10, etc.

In one example, indicia 112 promote that stored-value card 10 includes thermochromic feature 14. In one instance where thermochromic feature 14 resembles a lizard, indicia 106 state "Leaping Lizards, I change colors when touched!" As such, indicia 112 further promote the sale of stored-value card 10 by drawing the attention of a potential consumer to thermochromic feature 14.

Any of indicia 32, 34, 36, 106, 108, 110, 112, identifier 34, or other indicia optionally may appear anywhere on backer 100 or stored-value card 10. Additional information besides that specifically described and illustrated herein may also be included and/or one or more of indicia 32, 34, 36, 106, 108, 110, and 112 or identifier 34 may be eliminated.

In one embodiment, backer 100 includes a window or opening 114 for displaying account identifier 30 of stored-value card 10 therethrough as illustrated in FIG. 13. As previously described, account identifier 30 is adapted for accessing an account or a record associated with stored-value card 10 for activating, loading value to, or debiting value from the account or record. Accordingly, opening 114 allows viewing or other access to account identifier 30 to activate and/or load stored-value card 10 without removing stored-value card 10 from backer 100. In one embodiment, a portion of backer 100 alternatively is configured to be folded away from the remainder of backer 100 to access account identifier 30 without removing stored-value card 10 from backer 100.

In one embodiment, backer 100 is a bi-fold substrate defining a fold line 116, about which backer 100 is foldable roughly in half. In FIGS. 12 and 13, backer 100 is unfolded, i.e. is in an open configuration. According to one embodiment, FIG. 12 illustrates inside surfaces 120 of backer 100 that will be supported on a rack or other fixture to be visible to a consumer of a retail store who is considering the purchase of stored-value card 10. In another example, while on display in a retail store, backer 100 is folded back about fold line 116 to present only portions of inside surfaces 120 of backer 100 (i.e., the surfaces illustrated in FIG. 12) that are positioned on the same side of fold line 116 as stored-value card 10 to a consumer. In such an embodiment, indicia 106 would not be visible to a consumer when backer 100 and stored-value card 10 are placed for display in a retail store. Backer 100 is one example of means for supporting stored-value card 10 for display in a retail setting.

After purchase, backer 100 is foldable about fold line 116 such that inside surfaces 120 (FIG. 12) of backer 100 are folded toward each other and stored-value card 10 is enclosed or wrapped in a compact package formed by foldable backer 100. In this manner, outside surfaces 122 (FIG. 13) of backer 100 are disposed toward the outside of the folded, compact package, according to embodiments of the invention. In one embodiment, folded backer 100 effectively wraps stored-value card 10 for presentation from a consumer to a recipient. Folding backer 100 in the other direction about fold line 116 for display on a rack in a retail setting, or about other fold lines of backer 100 is also contemplated. In one embodiment, although described above and depicted in FIGS. 12 and 13 as a single fold line 116, fold line 116 may be one of a plurality of fold lines (not shown) so as to accommodate various thicknesses of or to otherwise wrap stored-value card 10 as will be apparent to those of skill in the art upon reading this application.

In one embodiment, a cut 124 is formed through backer 100 near an edge of backer 100 that is spaced from and substantially parallel to fold line 116. Cut 124 extends partially toward fold line 116 with an arcuate shape and defines a flap 126, which can be partially bent away from the remainder of backer 100. More specifically, upon folding backer 100 about fold line 116 to close backer 100 around stored-value card 10, an opposing edge of backer 100 is tucked beneath flap 126 to maintain backer 100 in a folded or closed position. In one embodiment, cut 124 and thereby flap 126 are each substantially semi-circular in shape. Other backers similar to backer 100 can be used having various sizes and shapes for supporting stored-value card 10.

Figure 14:
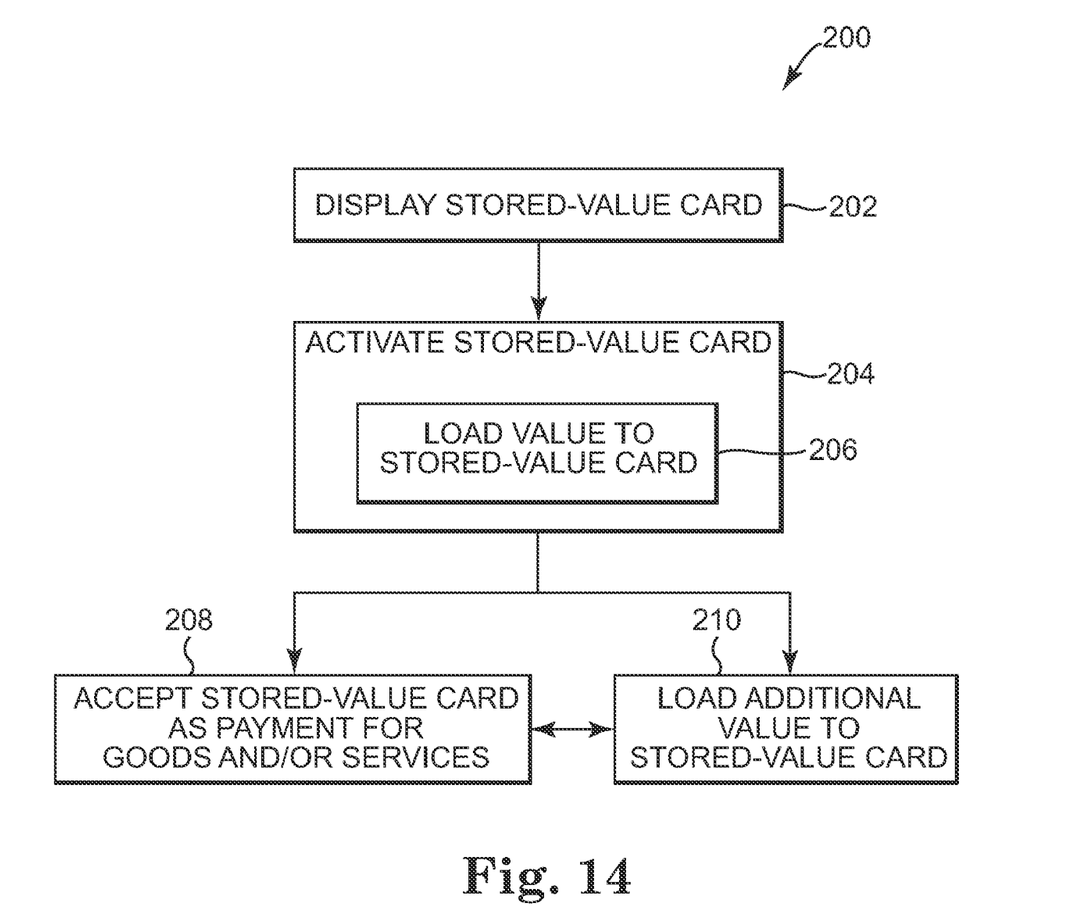
FIG. 14 is a flow chart illustrating a method of encouraging purchase and facilitating use of a stored-value card, according to one embodiment the present invention.

FIG. 14 is a flow chart illustrating one embodiment of a method 200 of encouraging purchase and facilitating use of stored-value card 10 by consumers and/or recipients. At 202, stored-value card 10 is placed on or hung from a rack, shelf, or other similar device to display stored-value card 10 for sale to potential consumers. For example, additionally referring to FIGS. 12 and 13, outside surfaces 122 of backer 100 may be folded about fold line 116 toward one another and stored-value card assembly 104 placed on a display rack such that stored-value card 10 is readily visible to potential consumers. In one embodiment, a depiction of stored-value card 10 is placed on a web site for viewing and purchase by potential consumers.

At 204, a consumer who has decided to purchase stored-value card 10 presents stored-value card 10 on backer 100 to a retail store employee, retail store kiosk, remote terminal, or other person or device to scan account identifier 30 to access an account or record linked to account identifier 30. In particular, account identifier 30 is scanned or otherwise accessed, for example through opening 114 of backer 100 to activate stored-value card 10. Upon accessing the account or record, then, at 206, value is added to the account or record in the form of monetary value, points, minutes, etc. Thus, stored-value card 10 is activated and loaded.

Once stored-value card 10 is activated and loaded, stored-value card 10 can be used by the consumer or any other bearer of stored-value card 10 to purchase goods and/or services at the affiliated retail setting (e.g., a retail store or web site) or can be used in exchange for calling minutes, etc. In one embodiment, where stored-value card 10 is displayed on a web site at 202, then, at 204, stored-value card 10 may be activated in any suitable method and may not require the physical scanning of account identifier 30 to be activated or to otherwise access the associated account or record such as at 206.

In one example, at 208, the retail store or other affiliated retail setting or web site accepts stored-value card 10 as payment towards the purchase of goods and/or services made by the current bearer of stored-value card 10. In particular, the value currently loaded on stored-value card 10 (i.e., stored or recorded in the account or record linked to account identifier 30) is applied toward the purchase of goods and/or services. At 210, additional value is optionally loaded on stored-value card 10 at a point-of-sale terminal, kiosk, or other area of the retail store or related setting. Upon accepting stored-value card 10 as payment at 208, the retail store or related setting can subsequently perform either operation 208 or operation 210 as requested by a current bearer of stored-value card 10. Similarly, upon loading additional value on stored-value card 10 at 210, the retail store or related setting can subsequently perform either operation 210 again or operation 208. In one example, the ability to accept stored-value card 10 as payments for goods and/or services is limited by whether the account or record associated with stored-value card 10 has any value stored or recorded therein at the time of attempted redemption.

Figure 15:
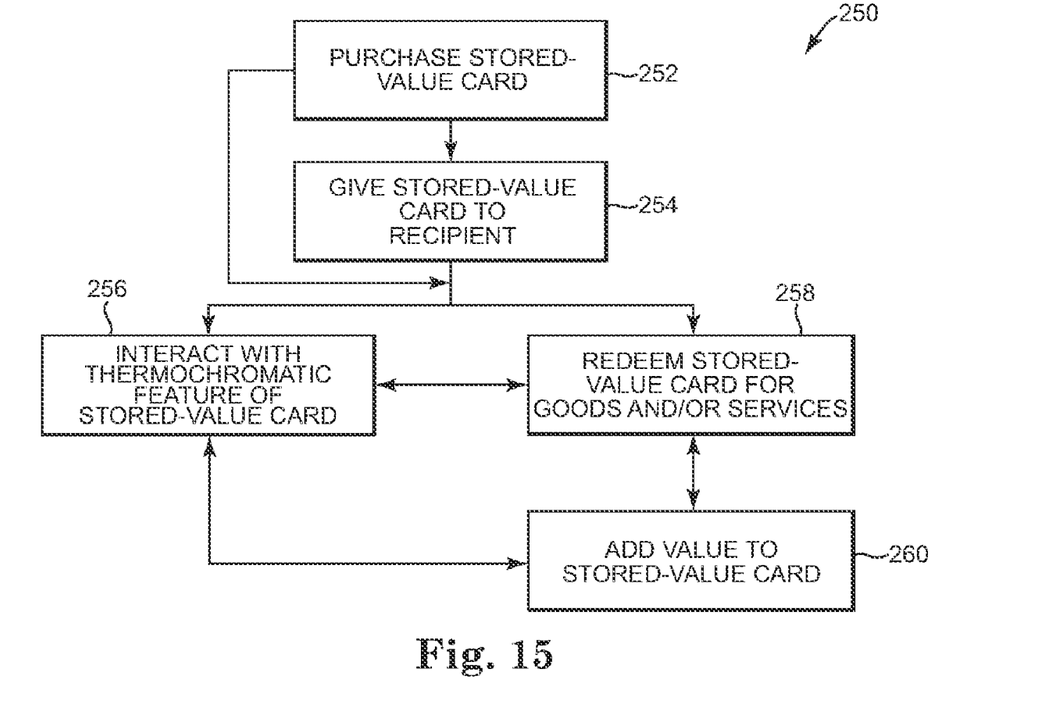
FIG. 15 is a flow chart illustrating a method of using a stored-value card, according to one embodiment of the present invention.

FIG. 15 is a flow chart illustrating one embodiment of a method 250 of using stored-value card 10 (e.g., FIGS. 1-8). At 252, a potential consumer of stored-value card 10, which is displayed in a retail store or viewed on a web site, decides to and does purchase stored-value card 10 from the retail store or web site. It should be understood that stored-value card 10 can be displayed and purchased alone or as part of stored-value card assembly 104 (FIG. 13) along with backer 100. Upon purchasing stored-value card 10, a retail store employee, a retail store kiosk, or other person or device scans account identifier 30 (FIGS. 3 and 13) through opening 114 of backer 100 or otherwise reads or accesses account identifier 30. Upon accessing account identifier 30, the account or record linked to account identifier 30 is accessed and activated to load value onto stored-value card 10 (i.e., load value to the account or record associated with stored-value card 10). In one embodiment, such as where stored-value card 10 is purchased at 252 via a web site, actual scanning or other mechanical detection of account identifier 30 may be eliminated.

At 254, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 254.

At 256, the consumer, recipient, or other current bearer of stored-value card 10 interacts with thermochromic feature 14 thereof for amusement. More specifically, as described above, the bearer heats thermochromic feature 14 with her body heat, which in turn causes the thermochromic feature 14 to change in visual appearance, for example, to change color, reveal graphics otherwise hidden prior to heating, etc. In one embodiment, following heating of thermochromic feature 14, thermochromic feature 14 eventually cools due to room or environmental temperature and return to its original visual appearance or state (i.e., thermochromic feature 14 is reversible). In one example, upon cooling of thermochromic feature 14, thermochromic feature 14 does not return to its original visual appearance or state (i.e., thermochromic feature 14 is irreversible).

At 258, the consumer or recipient redeems stored-value card 10 for goods and/or services from the retail store or web site. At 260, the consumer or recipient of stored-value card 10 optionally adds value to stored-value card 10, more particularly, to the account or record associated with account identifier 30 included therewith, at the retail store or over the Internet (i.e., via the web site). Upon interacting with thermochromic feature 14 at 256, redeeming stored-value card 10 at 258, or adding value to stored-value card 10 at 260, the consumer or recipient of stored-value card 10 subsequently can perform either of operations 256, 258, or 260 as desired. In one embodiment, the ability of the consumer or recipient to repeat redeeming stored-value card 10 at 258 is limited by whether the account or record linked with stored-value card 10 has any remaining value stored or recorded therein at the time of attempted redemption.

Although described above as occurring at a single retail store or web site, in one embodiment, purchasing stored-value card 10 at 252, redeeming stored-value card 10 at 258, and adding value to stored-value card 10 at 260, can each be performed at any one of a number of stores adapted to accept stored-value card 10 or over the Internet. In one example, a number of stores are each part of a chain or are similarly branded stores. In one example, a number of stores include at least one web site and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or a third party. The term "loading on" or "loaded on" herein should be interpreted to include adding to the balance of an account or record associated with a stored-value card. The balance associated with the stored-value card declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, calling cards, employee cards, frequency cards, prepaid cards, and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction card comprising:
   a substrate defining a first surface, wherein the substrate includes an account identifier linking the transaction card to at least one of an account and a record, and the account identifier is machine readable by a point-of-sale terminal;
   a thermochromic feature portraying a character on a portion of the first surface, wherein the character is a being, and an outer perimeter of the character defines an outer perimeter of the thermochromic feature; and
   accent indicia printed over at least a portion of the thermochromic feature and having a thickness of between about 25 microns and about 50 microns to provide relief to the first surface of the substrate;
   wherein the thermochromic feature is configured to change between a first state and a second state when an actual temperature of the thermochromic feature reaches an activation temperature of the thermochromic feature, and wherein, in the first state, the thermochromic feature appears as a first color, and in the second state, the thermochromic feature presents at least one of a second color and a graphic not otherwise visible when the thermochromic feature is in the first state.

2. The transaction card of claim 1, wherein the account identifier is a bar code.

3. The transaction card of claim 1, wherein the account identifier includes at least one of a bar code, a magnetic strip, a smart chip, and a radio frequency identification (RFID) device.

4. The transaction card of claim 1, wherein the thermochromic feature is configured to be heated to the activation temperature by exposure to human body heat.

5. The transaction card of claim 1, wherein the activation temperature is between about 20° C. and about 30° C.

6. The transaction card of claim 1, wherein the thermochromic feature includes background indicia printed to the first surface and thermochromic ink printed over the background indicia, wherein when the thermochromic feature is in the first state, the background indicia are hidden from view by the thermochromic ink, and when the thermochromic feature is in the second state, the background indicia are viewable through the thermochromic ink.

7. The transaction card of claim 6, wherein the thermochromic ink is the first color when the thermochromic feature is in the first state and is substantially transparent when the thermochromic feature is in the second state, and the background indicia positioned between the substrate and the thermochromic ink includes the second color.

8. The transaction card of claim 6, wherein the background indicia positioned between the substrate and the thermochromic ink includes a graphic.

9. The transaction card of claim 6, wherein the thermochromic ink is applied with a thickness of between about 25 microns and about 50 microns to fully cover the background indicia when the thermochromic feature is in the first state.

10. The transaction card of claim 6, wherein the background indicia are a pattern included within the outer perimeter of the character.

11. The transaction card of claim 1, wherein the accent indicia extend over the outer perimeter of the thermochromic feature and the outer perimeter of the character providing a ridge along the outer perimeter of the thermochromic feature, and the accent indicia are free from any thermochromic characteristics.

12. The transaction card of claim 11, wherein the character and the thermochromic feature are coextensive such that an entirety of the outer perimeter of the thermochromic feature is coextensive with an entirety of the outer perimeter of the character, the accent indicia extend along the outer perimeter of the thermochromic feature to form a ridge of relief along the outer perimeter of the thermochromic feature, and the accent indicia are free from any thermochromic characteristics.

13. The transaction card of claim 11, wherein the accent indicia extend along the entirety of the outer perimeter of the thermochromic feature.

14. The transaction card of claim 1, wherein the thermochromic feature is configured to return to the first state when cooled below the activation temperature.

15. The transaction card of claim 1, wherein the being is one of an animal, a person, an insect, and a fictional creature.

16. The transaction card of claim 1, in combination with a backer selectively coupled with and configured to support the substrate.

17. A stored-value card comprising:
a substantially planar member defining a first surface;
means for transitioning between a first visual impression and a second visual impression when heat is applied thereto, the means for transitioning being applied to the first surface;
means for providing readily discernable texture to the first surface of the substantially planar member, wherein the means for providing readily discernable texture is provided separately from the means for transitioning; and
means for linking the substantially planar member with at least one of an account and a record having a value associated therewith such that the substantially planar member can be used as payment toward a purchase of one or more of goods and services.

18. The stored-value card of claim 17, wherein at least a portion of the means for providing readily discernable texture extends over an outer perimeter of the means for transitioning to create a relief ridge along the outer perimeter, and the means for providing readily discernable texture is characterized by an absence of thermochromic properties.

19. A card comprising:
a substantially planar member defining a first surface;
means for transitioning between a first visual impression and a second visual impression when heat is applied thereto, the means for transitioning being applied to the first surface in a manner defining a character, wherein an outer perimeter of the character defines an outer perimeter of the means for transitioning;
means for providing readily discernable texture to the first surface of the substantially planar member, wherein the means for providing readily discernable texture is provided separately from the means for transitioning; and
means for linking the substantially planar member with at least one of an account and a record having a value associated therewith such that the substantially planar member can be used as payment toward the purchase of one or more of goods and services;
wherein the first visual impression presents a first color and the second visual impression presents at least one of a second color and a graphic not otherwise visible with the first visual impression.

20. A method of providing a transaction card, the method comprising:
printing background indicia to a first surface of a substrate;
printing heat-sensitive ink over a portion of the background indicia, wherein the heat-sensitive ink is printed with a thickness sufficient to initially hide the portion of the background indicia from view, and the heat-sensitive ink is configured to transition between a first appearance and a second appearance different from the first appearance when the heat-sensitive ink is heated beyond an activation temperature;
adding an account identifier to a substrate, wherein the account identifier links the transaction card to an account or record including a value available toward one of the purchase and use of at least one of goods and services; and
screen printing accent indicia over a portion of the heat-sensitive ink to have an accent indicia thickness between about 25 microns and about 50 microns to provide textural relief to the first surface of the substrate separate from the heat-sensitive ink, wherein the portion of heat-sensitive ink is less than all of heat-sensitive ink printed over the portion of the background indicia.

21. The method of claim 20, wherein in the first appearance, the heat-sensitive ink is a first color, and in the second appearance, the heat-sensitive ink is substantially transparent.

22. The method of claim 20, wherein in the first appearance, the heat-sensitive ink is a first color, and in the second appearance, the heat-sensitive ink is a second color.

23. The method of claim 20, wherein printing the heat-sensitive ink includes screen printing the heat-sensitive ink to have a thickness between about 25 microns and about 50 microns.

24. The method of claim 20, wherein printing the heat-sensitive ink includes curing the heat-sensitive ink under ultra-violet light.

25. The method of claim 20, wherein printing the heat-sensitive ink includes selecting the heat-sensitive ink configured to be heated to the activation temperature with human body heat.

26. The method of claim 20, wherein printing the heat-sensitive ink includes printing the heat-sensitive ink to define a character.

27. The method of claim 20, wherein the background indicia depict a character having an outside perimeter, the heat-sensitive ink is printed over the character such that the printed heat-sensitive ink defines an outer perimeter shared with the accent indicia, and the accent indicia provide textural relief to the card along the outer perimeter of the printed heat-sensitive ink.

* * * * *